Sept. 25, 1951 H. V. LEA 2,569,320
SPRAY TYPE PLANT BLOCKING MACHINE
Filed April 21, 1947 3 Sheets-Sheet 1

INVENTOR.
Henry V. Lea
BY
ATTYS

Patented Sept. 25, 1951

2,569,320

UNITED STATES PATENT OFFICE 2,569,320

SPRAY TYPE PLANT BLOCKING MACHINE

Henry V. Lea, Rio Vista, Calif., assignor of one-half to Blackwelder Manufacturing Co., Rio Vista, Calif., a partnership Application April 21, 1947, Serial No. 742,925

9 Claims. (Cl. 97—22)

This invention is directed to, and it is an object to provide, a novel method and machine for blocking row crops, such as sugar beets, whereby to leave plants for growth only at longitudinally spaced, evenly recurring points, as is desirable.

Another object of the invention is to provide a method and machine, as above, wherein the blocking of the plants is accomplished by the application, by spraying, of a plant destroying chemical fluid on all plants in a crop row except those desired to remain at said evenly recurring points.

A further object of the invention is to provide a machine, for chemically blocking plants as above, which includes a rotary carrier adapted to travel along a crop row in straddling relation, there being hood units on said carrier, in circumferentially spaced relation, adapted to cover and protect the plants to be retained at said points, and spray mechanism disposed to spray all plants in the row except those which the hood units cover as the machine advances.

An additional object of the invention is to provide a plant blocking method which comprises the steps of hooding certain plants in a crop row, and then spraying the remaining plants of the row with a plant destroying chemical fluid.

A further object of the invention is to provide a practical and convenient method and machine which will be exceedingly effective for the purpose for which it is designed.

These objects are accomplished by means of such structure and relative arrangement of parts as will fully appear by a perusal of the following specification and claims.

In the drawings:

Fig. 4 is a plan view, on reduced scale, and partly broken away, of the draft yoke.

Figure 1:
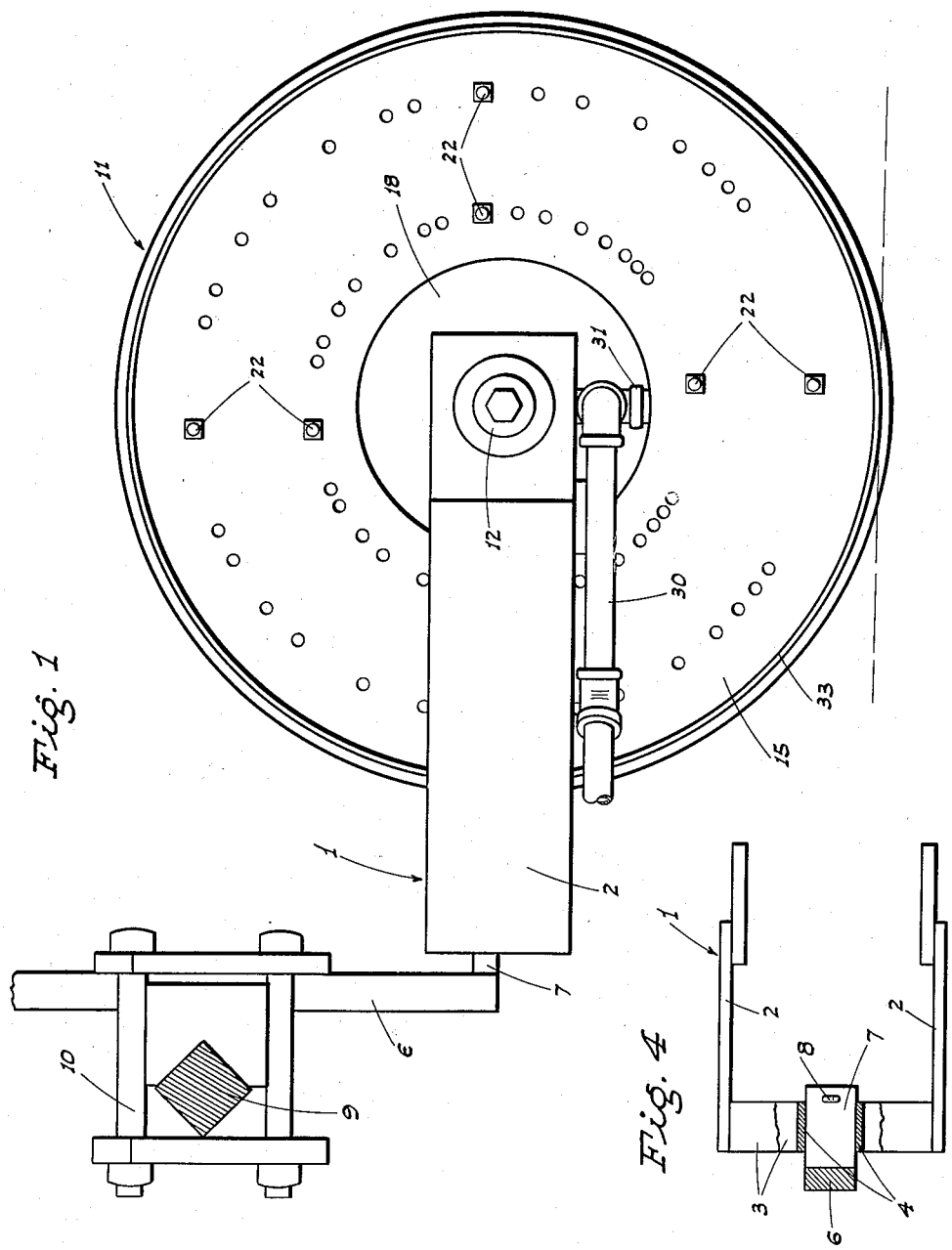
Fig. 1 is a side elevation of the plant blocking machine, as in use.
Figure 2:
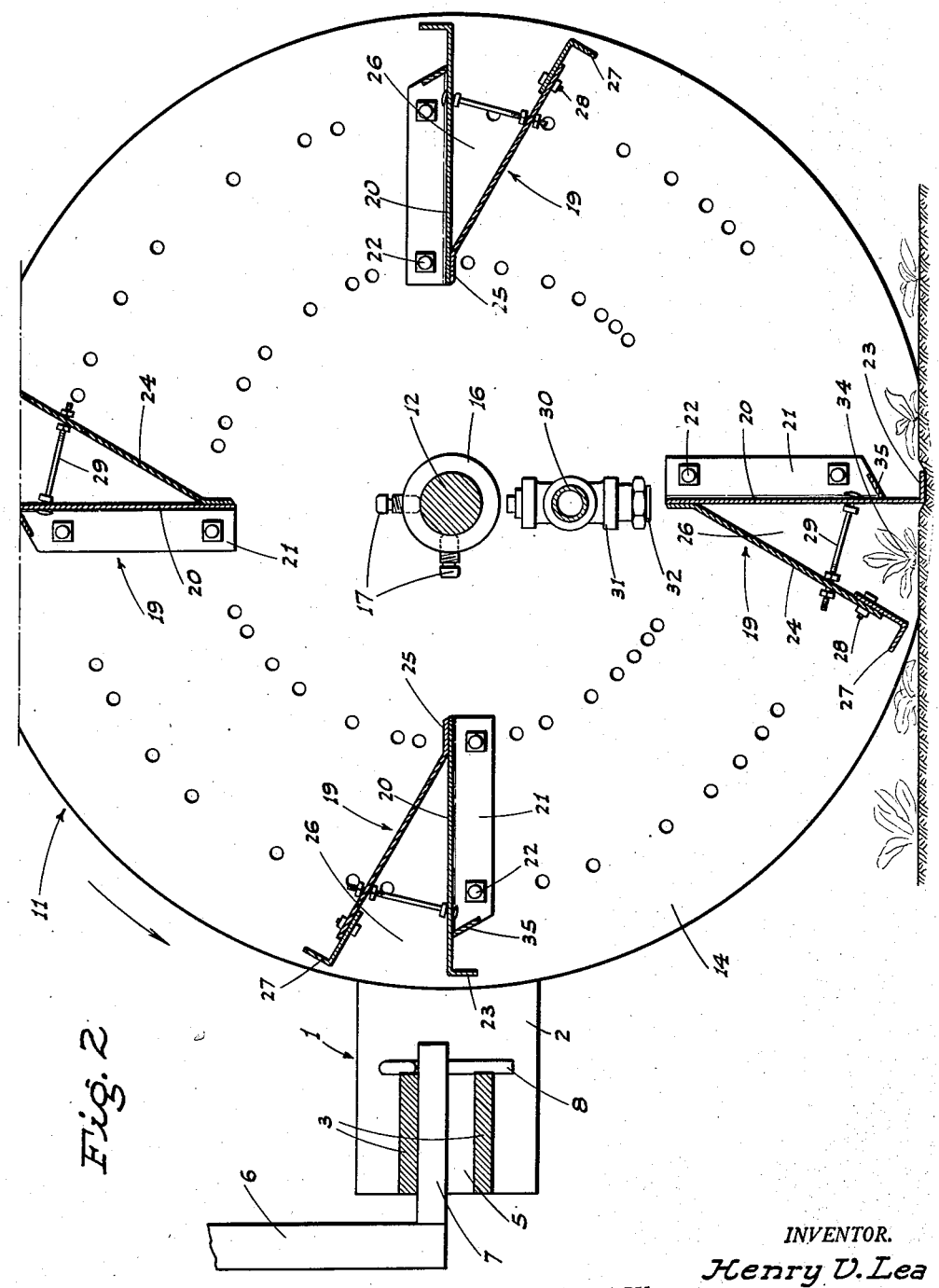
Fig. 2 is an enlarged, longitudinal sectional elevation of such machine, as in use.
Figure 3:
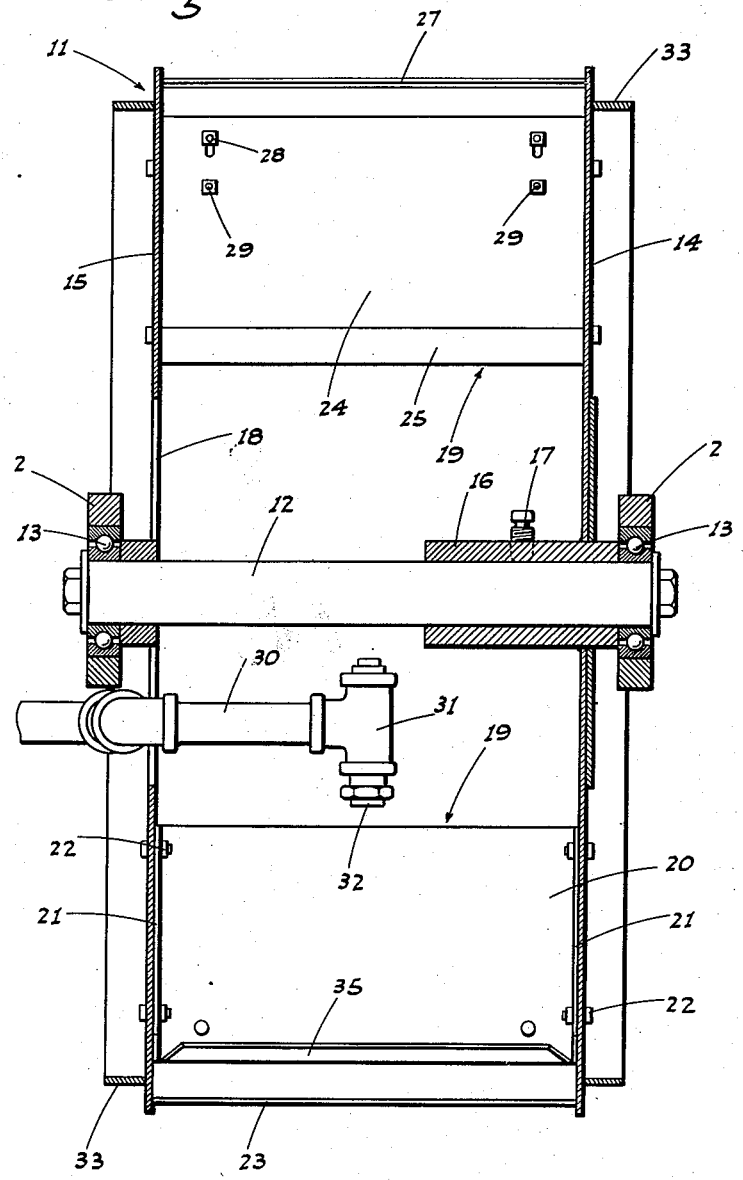
Fig. 3 is a transverse sectional elevation taken through the rotary carrier.

Referring now more particularly to the characters of reference on the drawings, the machine, for practicing the novel method of chemically blocking plants in a crop row, comprises a longitudinally extending, rearwardly opening draft yoke, indicated generally at 1, which includes parallel, rearwardly projecting side arms 2, and a vertically spaced pair of front cross bars 3. Transversely spaced webs 4 between the front cross bars 3 form a longitudinal, open-ended socket 5 which is rectangular in cross section.

A standard 6 upstands centrally ahead of the draft yoke 1 and includes a rearwardly projecting tongue 7 which extends through the socket 5 with a close sliding fit with the sides of the latter, whereby to prevent lateral swaying of the draft yoke 1. However, the tongue 7 has loose-play relationship with the socket 5 vertically, so that the draft yoke 1 may oscillate up and down for the purpose hereinafter described.

A vertical pin 8, through the tongue 7 to the rear of the cross bars 3, prevents the escape of the tongue forwardly from the socket 5.

The standard 6 is adapted to be laterally, as well as vertically, adjustably secured to the tool bar 9 of a tractor by means of a clamp 10.

Between the side arms 2 of the yoke 1, the machine includes a rotary carrier, indicated generally at 11, constructed as follows:

A cross shaft 12 extends between the rear end portions of the side arms 2 and is journaled in connection with the same by means of bearings 13. A pair of end discs 14 and 15 surround the shaft 12 in concentric relation; said end discs being of relatively large diameter. The end disc 14 includes an elongated hub 16 fixed to the cross shaft 12 by set screws 17, while the other end disc 15 is formed with a central port 18.

The discs 14 and 15 are connected in rigid relation, for rotation as a unit, by means of a plurality of circumferentially spaced, transversely extending shield or hood units, as indicated at 19.

The hood units 19 are equally circumferentially spaced and can be used in any selected number, as the discs 14 and 15 include multiple perforations, as shown, for the attachment of four or more of said hood units 19 in said equally spaced relation.

The hood units 19, which open outwardly, extend generally radially inwardly from the periphery of the rotary carrier 11 to a termination short of the center cross shaft 12; such units 19 comprising the following:

A back plate 20 disposed radially of the rotary carrier extends transversely between the end discs 14 and 15, and at its ends said back plate 20 is formed with end flanges 21 which attach to corresponding ones of the discs by bolts 22. At its radially outermost edge the back plate 20 is formed with a rearwardly projecting foot 23 adjacent the periphery of the rotary carrier 11.

A front plate 24 is formed, at its radially inner edge portion, with a transverse flange 25 fixed to the corresponding portion of the back plate 20, as by spot welding or the like; the front plate 24 thence extending outwardly in forwardly diverging relation to said back plate 20 whereby to form, between said plates and between said end discs 14 and 15, an outwardly opening cavity 26.

At its radially outer edge, each front plate 24 includes a forwardly projecting foot 27 arranged for in or out adjustment, as at 28.

Transversely spaced adjustment bolts 29 connect the back plate 20 and front plate 24 intermediate their ends, whereby the angle of divergence, and consequently the circumferential extent of the cavity 26 may be varied; the front plate 24 being sufficiently resilient to permit of this adjustment.

As it is desirable that the foot 27 run close to the periphery of the rotary carrier, it is necessary that such foot be adjustable, as at 28.

The spray mechanism of the machine comprises a feed pipe 30 to which a chemical plant destroying fluid is fed under pressure from a suitable supply reservoir and pump on the tractor to which the machine is connected in draft relation. The feed pipe 30 extends through the central port 18 in the end disc 15 into the rotary carrier 11, and centrally thereof below cross shaft 12 carries a fitting 31 having a downwardly projecting nozzle 32. The nozzle 32 is of a type which throws a fan spray transversely within the rotary carrier 11 between the end discs 14 and 15, which fan spray is relatively thin in the direction of travel.

When the described machine is coupled to a tractor in draft relation, and in use, the rotary carrier 11 is pulled lengthwise of a crop row in straddling relation thereto; the end discs 14 and 15 running on opposite sides of the row. Undue penetration of such end discs 14 and 15 into the ground is prevented by laterally, outwardly projecting flotation bands 33 on the outside of each disc concentric to its axis, and adjacent but short of its periphery.

With advance of the rotary carrier 11 the nozzle 32 sprays the chemical plant blocking fluid on all plants in the row upon passage of said carrier, except those plants, as at 34, which are hooded at longitudinally spaced, evenly recurring points, by the hood units 19. In other words, as the rotary carrier 11 travels forwardly, the hood units 19 successively engage over plants 34 in the crop row, preventing such plants from being sprayed by the nozzle 32. As a result these hooded plants 34 survive, while all other plants in the row are destroyed by the fluid which has been sprayed thereon. In this manner an even and effective plant blocking operation is accomplished.

As the front plate 24 is adjustable relative to the back plate 20 of each hood unit 19, the circumferential extent of each cavity 26 may be varied, dependent upon the type of crop being blocked; some plants being larger than others and thus requiring a greater cavity for effective hooding.

The feet 23 and 27 of the plates 20 and 24 of each hood unit 19 bear against the ground as they traverse the bottom of the rotary carrier 11, thus tending to prevent any of the spray from gaining access, undesirably, into the cavity 26 in which a plant 34 is then shielded. The rear end of the back plate 20 is also provided with a transverse gutter 35, adapted to catch spray fluid which might otherwise drip over the foot 23 onto the previously shielded plant 34 as the carrier travels away therefrom. Each gutter 35 discharges at its ends so that fluid dripping therefrom will not contact any plant intended to be retained.

The feature of the draft yoke 1, being capable of vertical oscillation, as previously explained, is advantageous for the reason that it permits the rotary carrier 11 to maintain proper ground contact at all times, even where there may be some variance in contour.

The above described plant blocking method and machine is rapid and effective, and provides a very practical and convenient way to block crop rows.

From the foregoing description it will be readily seen that there has been produced such a plant blocking method and machine as will substantially fulfill the objects of the invention, as set forth herein.

While this specification sets forth in detail the present and preferred method and machine, still in practice such deviations therefrom may be resorted to as do not form a departure from the spirit of the invention, as defined by the appended claims.

Having thus described the invention, the following is claimed as new and useful, and upon which Letters Patent are desired:

1. A machine for chemically blocking crop rows, comprising a support adapted for movement along a crop row, a rotary carrier journaled on the support for turning movement along the crop row, a plurality of hood units mounted on the rotary carrier in circumferentially spaced relation and opening outward adjacent the periphery of said carrier, and a mechanism in the rotary carrier adapted to spray a chemical plant destroying fluid downwardly onto the plants in the row in direct intersecting relation to the rotary path of said hood units; each hood unit including a pair of walls spaced circumferentially of the rotary carrier, and full width feet on the outer edges of said walls.

2. A machine for chemically blocking crop rows, comprising a support adapted for movement along a crop row, a rotary carrier journaled on the support for turning movement along the crop row, a plurality of hood units mounted on the rotary carrier in circumferentially spaced relation and opening outward adjacent the periphery of said carrier, and a mechanism in the rotary carrier adapted to spray a chemical plant destroying fluid downwardly onto the plants in the row in direct intersecting relation to the rotary path of said hood units; the rotary carrier including end discs, and the hood units extending transversely between and secured to said discs.

3. A machine for chemically blocking crop rows, comprising a support adapted for movement along a crop row, a rotary carrier journaled on the support for turning movement along the crop row, a plurality of hood units mounted on the rotary carrier in circumferentially spaced relation and opening outward adjacent the periphery of said carrier, the rotary carrier including spaced end discs and the hood units extending transversely between and secured to said discs, and a mechanism in the rotary carrier adapted to spray a chemical plant destroying fluid downwardly onto the plants in the row from directly above the low point of said hood units.

4. A machine for chemically blocking crop rows, comprising a support adapted for movement along a crop row, a rotary carrier journaled on the support for turning movement along the crop row, a plurality of hood units mounted on the rotary carrier in circumferentially spaced relation and opening outward adjacent the periphery of said carrier, the rotary carrier including spaced end discs and the hood units extending transversely between and secured to said discs, and a mechanism in the rotary carrier adapted to spray a chemical plant destroying fluid downwardly onto the plants in the row from directly above the low point of said hood units; each hood unit including a back plate and a front plate secured together at their edges and thence diverging outwardly.

5. A machine for chemically blocking crop rows, comprising a support adapted for movement along a crop row, a rotary carrier journaled on the support for turning movement along the crop row, a plurality of hood units mounted on the rotary carrier in circumferentially spaced relation and opening outward adjacent the periphery of said carrier, the rotary carrier including spaced end discs and the hood units extending transversely between and secured to said discs, and a mechanism in the rotary carrier adapted to spray a chemical plant destroying fluid downwardly onto the plants in the row from directly above the low point of said hood units; each hood unit including a back plate and a front plate secured together at their edges and thence diverging outwardly, and means to alter the angle of divergence of one plate relative to the other.

6. A machine as in claim 5 including full width feet on the outer edges of both plates; the foot of said one plate being adjustable relative to the periphery of the rotary carrier.

7. A machine for chemically blocking crop rows, comprising a draft yoke, a cross shaft journaled on the draft yoke, a rotary carrier mounted on the cross shaft including end discs, said rotary carrier being adapted to straddle a crop row in ground engagement, a plurality of hood units mounted on the rotary carrier in circumferentially spaced relation and opening outward adjacent the periphery of said carrier, the hood units extending transversely between and secured to said discs, and a spray nozzle confined between the discs below the shaft and positioned to discharge directly downwardly from a point in clearance relation to the path of travel of the hood units, and conduit means for feeding fluid to the nozzle.

8. A plant blocking machine for row crops, such machine comprising a mobile frame, a rotary ground engaging carrier journaled on the frame, a plurality of hoods spaced circumferentially about the carrier adjacent the outer periphery thereof, the open ends of the hoods facing outwardly of such outer periphery of the carrier, a spray nozzle disposed at a point between the inner ends of the hood and the central axis of the carrier, said nozzle being adapted to discharge a spray downwardly on a generally radial line extending perpendicularly from the center of rotation of the discs to the ground, and substantially inward of the outer periphery of the carrier, and means to feed a plant toxic fluid to the spray nozzle.

9. A plant blocking machine for row crops, such machine comprising a mobile supporting frame, a rotary ground engaging carrier journaled on the frame, said carrier including a pair of laterally spaced apart discs, a plurality of hoods spaced circumferentially between the discs adjacent the outer periphery thereof, the open ends of the hoods facing outwardly of the periphery of the carrier, a spray nozzle disposed between the discs and at a point between the inner ends of the hoods and the central axis of the carrier, said nozzle being adapted to discharge a spray of material substantially confined between the discs and in a downwardly direction on a generally radial line extending perpendicularly from the center of rotation of the discs to the ground, and means to feed a plant toxic fluid to the nozzle.

HENRY V. LEA.

REFERENCES CITED

The following references are of record in the file of this patent:

UNITED STATES PATENTS

| Number | Name | Date |
|---|---|---|
| 439,176 | Pace | Oct. 28, 1890 |
| 1,088,969 | Cox | Mar. 3, 1914 |

OTHER REFERENCES

Mississippi Agricultural Experiment Station Bulletin 423, "Mechanical Production of Cotton," pages 5 and 7.

Louisiana Agricultural Experiment Station Bulletin 415, "Flame Cultivation," page 4.